June 22, 1937.                 A. SCAISON                 2,084,508
                            BRAKE HOLDING RING
                            Filed July 16, 1936

INVENTOR
ALEXANDER SCAISON
BY
Harue E. Thompson
ATTORNEY

Patented June 22, 1937

2,084,508

UNITED STATES PATENT OFFICE 2,084,508

BRAKE HOLDING RING

Alexander Scaison, New York, N. Y.

Application July 16, 1936, Serial No. 90,881

3 Claims. (Cl. 192—6)

This invention relates to coaster brakes and similar devices employed in connection with wheeled vehicles, commonly referred to as bicycles and in the class of wheeled goods, and particularly to the provision of a brake holding ring for supporting the stationary element of the coaster brake in the frame of the vehicle; and the object of the invention is to provide a ring of the class described having a pair of projecting lugs extending from a central opening or aperture in said ring to the peripheral edges thereof and at one side surface of the ring to provide long engaging surfaces adapted to be arranged in the forked end of the frame to key and retain the stationary brake element against rotation in the frame; a further object being to provide the surface of said ring having the projecting lugs or elements with teeth or projections arranged longitudinally of and parallel to the longitudinal plane of the lugs and adapted to engage one side surface of the forked portion of the frame to reinforce said frame and prevent the spreading of the forked portion thereof; a further object being to provide a ring of the class described the aperture of which is angular or elliptical in form to engage a correspondingly formed trunnion or part of said stationary element to key the ring thereon to prevent relative rotation of such parts; and with these and other objects in view the invention consists in a device of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Figure 1:
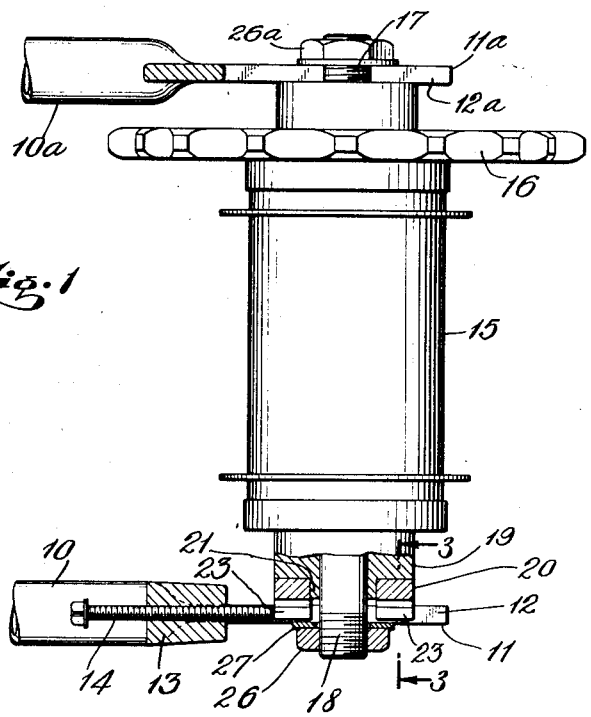
Fig. 1 is a plan and sectional view of the forked end portion of a bicycle diagrammatically illustrating the coaster brake mechanism and showing one of my improved rings in section.

In the drawing I have shown at 10 and 10a the rear end portions of the bicycle frame which terminate in the fork-shaped extensions 11—11a having elongated slots 12—12a. At the inner end of the forked-shaped extensions are bearing or coupling portions 13, in one of which is mounted an adjustment tube 14 which serves to properly set or adjust the coaster brake cylinder 15 in the bicycle frame and primarily to take up the slack in the chain engaging the drive sprocket 16 of said coaster brake. At 17, I have shown one projecting trunnion which passes through the fork 11a. At 18, I have shown the other projecting trunnion passing through the fork 11, and at 19, I have shown a part of the stationary member or element of the coaster brake in connection with which one of my improved holding rings 20 is mounted.

Figure 2:
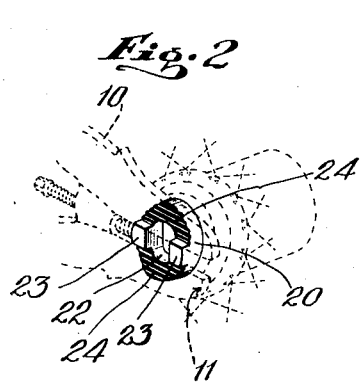
Fig. 2 is a perspective view of the ring shown in Fig. 1 diagrammatically showing, in dotted lines, the arrangement of a part of the bicycle which clearly illustrates the relative position of the parts.
Figure 3:
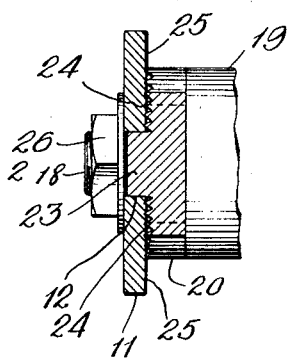
Fig. 3 is a partial section on the line 3—3 of Fig. 1 on an enlarged scale.

In the construction shown in Figs. 1 to 3 inclusive, the member 19 has an elliptical extension 21 entering a corresponding elliptical hole or aperture 22 formed in the ring 20 so as to key the ring on said extension and against rotation with respect to the stationary member 19.

The outer surface of the ring 20 is provided with upwardly projecting lug or key elements 23 which, in the construction shown, extend from the aperture 22 to the peripheral edges of said ring and are adapted to fit in the slot 12 on the forked extension 11, as clearly seen in Figs. 1 and 3 and indicated in Fig. 2 of the drawing. This mounting or engagement serves to key or retain the member 19 against rotation in the frame 10 or the forked extension 11 thereof.

I also provide means for retaining the separate parts of the forked extension 11 from separation when subjected to excessive stresses or strains. In the accompanying drawing, I accomplish this result by providing, on the outer surface of the ring above and below the projecting lug 23, longitudinally arranged and spaced teeth or projections 24, which are adapted to bite into and firmly engage the inner surfaces 25 of the forked extension 11, as clearly represented in Fig. 3 of the drawing, so as to prevent relative movement or spreading of said forked end portion or the separate parts forming said forked extension.

Figure 4:
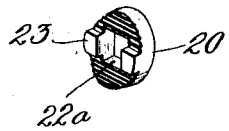
Fig. 4 is a perspective view of a modified form of ring which I employ.

By utilizing a coupling ring of the type described as well as a ring similar to that shown in Fig. 4, the forked end portion of the frame, in connection with which the stationary member of a coaster brake is coupled, may be reinforced against spreading in a very simple and economical manner, and further in such a way as to adapt the single ring to vehicle frames regardless of the difference in construction thereof, and especially the outside dimensions of the forked end of the frame. The slot or aperture of the fork has been standardized but the other dimensions of the fork are not standardized and, as above stated, my ring will be suitable in connection with the different types of frames which may be employed.

The only difference between the construction shown in Fig. 4 and that shown in the other figures is the substitution of a square or angular aperture 22a for the elliptical aperture 22 in order to adapt the ring to coaster brakes of different constructions, and these two forms are more or less universally used.

In mounting the coaster brake in position, it will be understood that a nut 26 is applied to the projecting trunnion 18 in order to draw the ring 20 into firm engagement with the forked extension 11, in the manner above described, and a washer 27 is preferably employed between the nut and the outer surface of the forked extension. A similar nut 26a is also coupled with the projecting trunnion 17 to mount the other end of the cylinder portion 15 in connection with the forked end 11a of the frame 10a.

It will be understood that in constructing my improved ring the same may be composed of hard material or a hardened material sufficient to provide the biting or cutting engagement with the inner surface of the forked extension 11a, and while I have shown one method of performing this function and operation, it will be understood that other types and arrangements of projections may be employed to accomplish the same result.

Having fully described my invention, what I claim as new and desire to secure by Letters Patent, is:

1. A coupling member for coaster brakes of wheeled vehicles comprising a ring having centrally thereof an aperture of irregular contour, one side face of said ring having projecting keying means, and said side face of the ring having above and below said first named means other projecting coupling elements arranged within the peripheral edges of said ring.

2. A coupling member for coaster brakes of wheeled vehicles comprising a ring having centrally thereof an aperture of irregular contour, one side face of said ring having projecting keying means, said side face of the ring having above and below said first named means other projecting coupling elements arranged within the peripheral edges of said ring, and the said coupling elements involving longitudinally arranged and vertically spaced teeth.

3. The combination with a coaster brake for vehicles of the class described, of means for coupling the stationary element of the brake with the forked portion of the vehicle frame to prevent rotary movement of said element in the frame, said element having a shank of irregular cross section, said means comprising a ring having an aperture of irregular form fitting said irregular shank to retain the ring against rotation on said element, said ring having projecting means on one surface thereof entering the fork of the frame to key said ring and element against rotation in the frame, and other means on said ring engaging one side surface of the forked portion of the frame in close proximity to said second named means for retaining the forked portion against spreading when subjected to excessive stress or strain.

ALEXANDER SCAISON.